US 6,603,310 B2

(12) United States Patent
Georgi et al.

(10) Patent No.: US 6,603,310 B2
(45) Date of Patent: Aug. 5, 2003

(54) METHOD FOR CORRECTING DOWNHOLE NMR DATA CONTAMINATED BY BOREHOLE SIGNALS

(75) Inventors: Dan T. Georgi, Houston, TX (US); Songhua Chen, Katy, TX (US); Holger Thern, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/896,463

(22) Filed: Jun. 29, 2001

(65) Prior Publication Data

US 2003/0006767 A1 Jan. 9, 2003

(51) Int. Cl.[7] .................................................. G01V 3/00
(52) U.S. Cl. ..................................................... 324/303
(58) Field of Search .................................. 324/303, 300

(56) References Cited

U.S. PATENT DOCUMENTS

| | | | |
|---|---|---|---|
| 3,321,625 A | 5/1967 | Wahl | 250/71.5 |
| 4,251,921 A | 2/1981 | Fink | 33/178 F |
| 4,423,323 A | 12/1983 | Ellis et al. | 250/264 |
| 5,432,446 A * | 7/1995 | MacInnis et al. | 324/303 |
| 5,737,277 A | 4/1998 | Priest | 367/27 |
| 6,229,308 B1 * | 5/2001 | Freedman | 324/303 |
| 6,255,817 B1 * | 7/2001 | Poitzsch et al. | 324/303 |
| 6,346,813 B1 * | 2/2002 | Kleinberg | 324/303 |
| 2003/0006767 A1 * | 1/2003 | Georgi et al. | 324/303 |

FOREIGN PATENT DOCUMENTS

| GB | WO97/34166 | * | 9/1997 |
|---|---|---|---|
| GB | 2341685 A | * | 3/2000 |

* cited by examiner

Primary Examiner—Edward Lefkowitz
Assistant Examiner—Tiffany A. Fetzner
(74) Attorney, Agent, or Firm—Madan, Mossman & Sriram, P.C.

(57) ABSTRACT

NMR measurements made in a borehole are susceptible to contamination by signals from the borehole fluid. Correction is made for this contamination by using a standoff measuring device to determine the fractional volume of the region of investigation of the NMR tool that lies within the borehole. Using known or determined characteristics of the borehole fluid, a correction is made either to the NMR signals prior to processing or to the processed results of the uncorrected signals.

26 Claims, 2 Drawing Sheets

METHOD FOR CORRECTING DOWNHOLE NMR DATA CONTAMINATED BY BOREHOLE SIGNALS

BACKGROUND OF THE INVENTION

1. Field of the Invention

The invention is in the field of Nuclear Magnetic Resonance ("NMR") tools and data processing methods. More specifically, the invention pertains to detecting borehole contamination and correcting NMR data for the effects of the contamination in well logging.

2. Description of the Related Art

Nuclear Magnetic Resonance has uses in many areas, including the fields of medicine, chemistry, non-destructive testing, and in well logging in the oil exploration industry. In the well logging industry, NMR is used in determining properties such as porosity of the formation, permeability, the bound liquid volume, the clay bound volume (CBW) and bulk volume irreducible (BVI), as well as other formation and reservoir fluid properties.

In a typical NMR device used in logging, a permanent magnet produces the static magnetic field and establishes the direction of orientation for the nuclear magnetic moments in the vicinity of the borehole. An RF field is applied in the plane perpendicular to the static magnetic field. Typically in the art, the static field $B_0$ is a function of distance from the tool. Thus, at a given frequency, the NMR resonance condition $$f = \gamma B_0 / 2\pi \quad (1)$$

where $f$ is the frequency of the RF field, and $\gamma$ is the gyromagnetic ratio must be satisfied. For a selected operating frequency, the location and size of the sensitive volume are determined by the magnetic field intensity, the field gradient and the effective bandwidth of the pulse. In the case of multi-frequency operations, a discrete number of closely spaced and substantially non-overlapping sensitive volumes are obtained. The union of these sensitive volumes is defined as the sensitive volume of a given tool with a given acquisition method.

Typically, drilling muds that are present within a borehole are oil or water based and hence have a large number of hydrogen nuclei: these are a strong source of contaminating NMR spin echo signals that may be stronger than the desired signals from the rock formation. To avoid receiving signals from within the borehole fluid, it is clearly desirable to contain the entire sensitive region within the rock formation and outside the borehole. In many tools, the sensitive region is a cylindrical shell which is coaxial to the permanent magnet, although other spatial arrangements can be used. Since the sensitive region lies close to the surface of the borehole cavity, geometric anomalies in the surface of the wellbore can cause portions of the sensitive region to lie inside the borehole cavity rather than inside the rock formation, causing NMR signals to be received from what is contained inside the borehole, usually drilling mud.

As one example of possible anomalies, the drilling tool can be off-axis with the borehole and additionally can be lying against one side of the borehole, revealing a portion of the sensitive region to the borehole cavity. In another example, the borehole might have an elliptical cross-section rather than a circular one. In yet a third possibility, there can be a significant amount of washout, where certain segments of the wall have separated and fallen away, leaving a cavity to one side of the borehole. Drilling muds typically contain 80% or more of fluids. This is much higher than the fluid content of the surrounding rock formation. Contamination of wellbore signals in NMR by mud signals spoils all critical petrophysical estimates including porosity, permeability, and $T_2$ distribution.

The amount of contamination depends to a great deal on the depth of investigation of the measuring device. As an example, some methods, such as neutron porosity measurement, have a depth of investigation equal to 10" to 20", and consequently have very little if any contamination due to the presence of mud. However, current pad NMR tools have a depth of investigation of about 0.5" to 1" while centralized NMR tools have a 1"–3" depth of investigation. When the sensitive region lies so close to the surface of the borehole, as is the case in NMR logging, the rugosity of the surface becomes important. With a high rugosity, there is ample opportunity for mud to enter into the sensitive volume and send anomalous signals to the receiver mechanism. Borehole rugosity is a valuable measure to know, since borehole rugosity allows the mud volume to infringe upon the measurements in the sensitive volume. Good knowledge of this value can alert the practitioner that the data needs to be flagged and corrected.

Although corrections for mud signals have been made in other logging methods, there is no similar method designed for use in NMR well logging. U.S. Pat. No. 3,321,625 (Wahl et al.) corrects for the effects of mud in gamma—gamma logging, using the knowledge of the mud density. U.S. Pat. No. 4,423,323 (Ellis et al.) addresses the problem in neutron logging.

Mechanical lever devices have been used in other logging processes to determine the amount of offset of the NMR tool. But these devices have not been used for the purpose of NMR measurements. Measuring devices can also be used to determine the borehole rugosity.

SUMMARY OF THE INVENTION

The present invention is a method of correction of data or results of processing data made by an NMR tool within a borehole for effects of borehole fluids. A fractional volume of the region of investigation of the NMR tool that lies within the borehole is determined. This is based upon knowledge of the geometry of the volume of investigation of the tool and its temperature dependence. Suitable averaging may be done within the vertical aperture of the NMR tool as well as averaging over a plurality of depths. The characteristics of the borehole fluids are either known or are measured within the borehole at a depth where the entire volume of investigation lies within the borehole. In one embodiment of the invention, a correction is made to the results obtained by processing the uncorrected data using prior art methods. In another embodiment of the invention, the NMR signals are corrected prior to processing.

DESCRIPTION OF PREFFERED EMBODIMENT

The method of the present invention may be used with any one of several devices. In a preferred embodiment of the invention suitable for use for wireline logging, centralized tool is used, although the method of the present invention is applicable to other tools such as pad devices or side-looking devices. For measurement-while-drilling (MWD) applications, a suitable device is disclosed in U.S. Pat. No. 6,215,304. Such devices are for exemplary purposes only. As would be known to those versed in the art, these NMR tools have a magnet for generating a static magnetic field in the formation and an RF antenna assembly is used to generate a pulsed RF magnetic field in a region of investigation. NMR signals are detected using a receiver antenna and further analyzed to provide information about formation properties such as total porosity, clay bound water, capillary bound water and hydrocarbons.

Ideally, in well logging, the sensitive volume of the NMR tool will lie entirely within the rock formation. However, when washout occurs, pieces of the rock formation fall away from the sides of the borehole wall, creating a cavity into which the mud flows. If this washout region overlaps the sensitive volume of the NMR tool, then the signals received from the mud will contribute to a portion of the NMR signal. Borehole washout therefore allows the inflow of mud to contaminate the signal.

Figure 1:
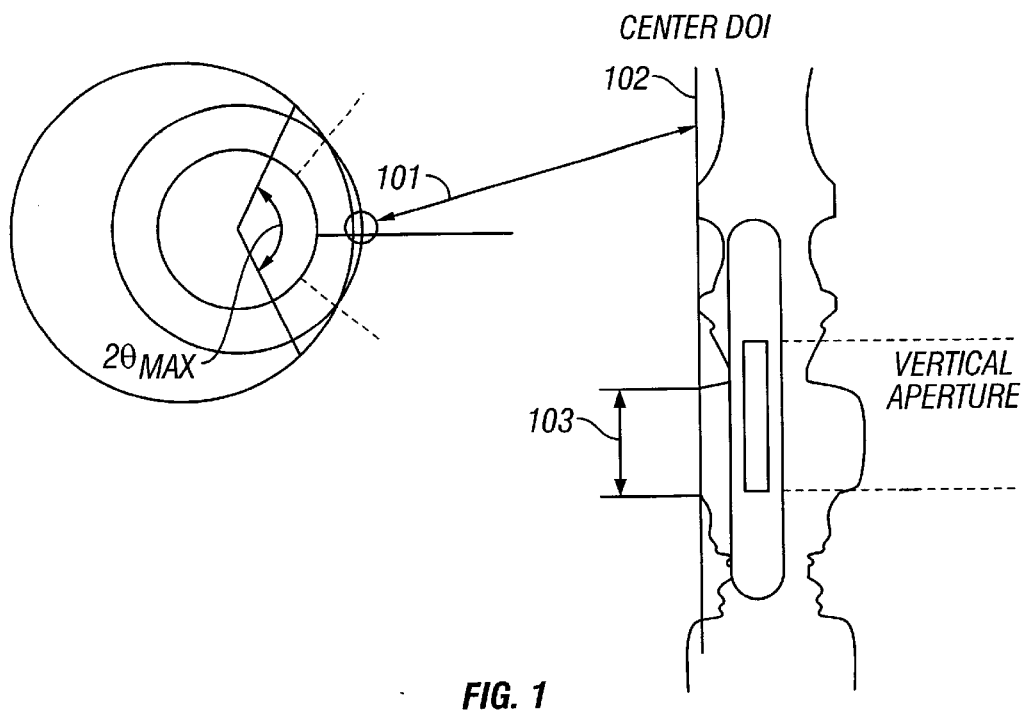
FIG. 1 shows the effect a typical washout of a borehole can have on the placement of the sensitive region.

Borehole washout can take an endless variety of forms. FIG. 1 depicts a short interval washout. The dark line (101) indicates the location of the center depth of investigation, which is the symmetrical point of the tool sensitive volume. As seen in the figure, washout causes some portions of the sensitive volume to lie outside the rock formation, therefore allowing mud to contribute to the NMR signal. In this figure, the length of the vertical aperture of the NMR device is substantially greater than the length of the washout (103). It is also possible to have a washout region large enough such that the entire depth of investigation along the vertical aperture lies completely within the borehole. In this situation, all of the received NMR signals would be due to the mud and none from the rock formation. Similarly, it is possible that the angular extent of the investigated region, labeled as $2\theta_{max}$, will cause a portion of the region of investigation to lie within the borehole. To make a correct assessment of the effect of the washout on the NMR signal, it is necessary to determine the volume of the sensitive region which is occupied by mud as well as that volume which is occupied by the rock formation. To calculate these volumes, it is necessary to know the distances from points on the surface of the borehole wall to corresponding points on the surface of the NMR tool.

The embodiment of the invention presented herein is designed to address the problems associated with washout in wellbore drilling and logging. Specifically, it corrects NMR signal contamination due to borehole rugosity (non circular geometry) and NMR signals received from a volume which mud occupies.

Figure 2:
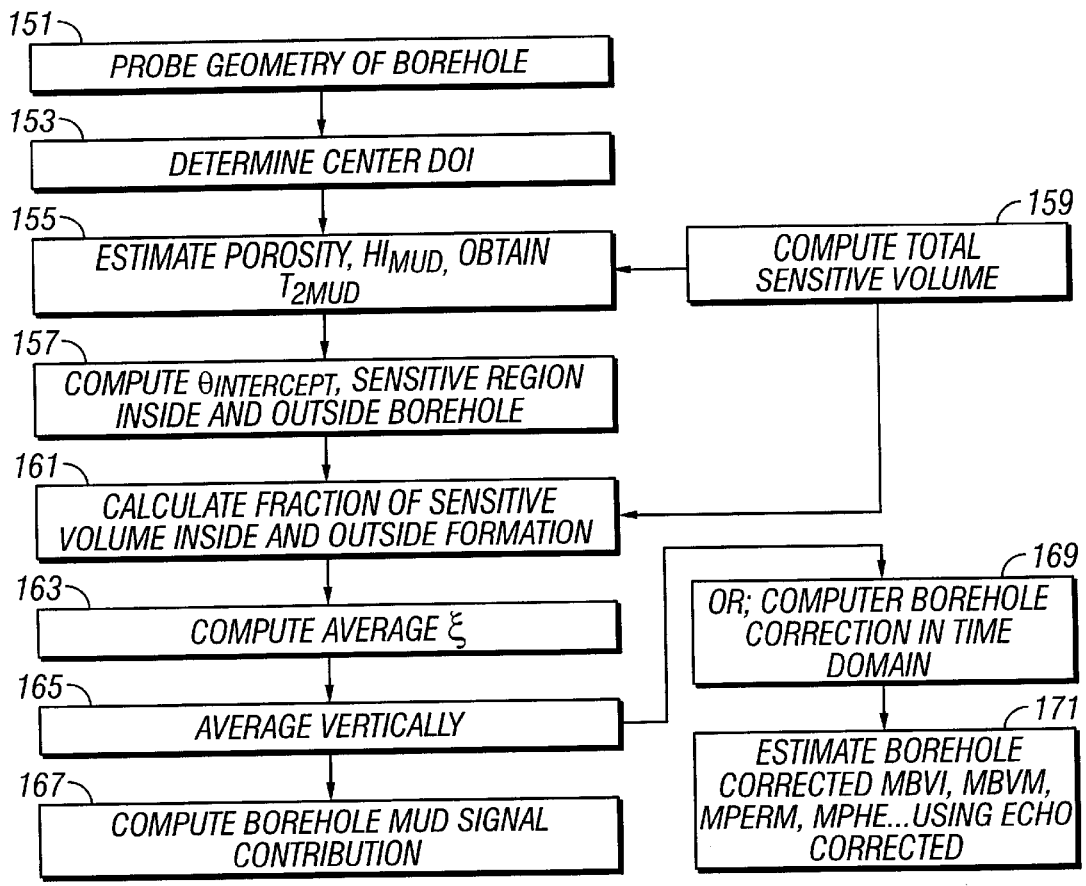
FIG. 2 shows a flowchart of the method of the present invention for correcting NMR signals for mud effects.

The invention is comprised of a method for making corrections to compensate for borehole mud. Steps of the method are detailed in the flowchart of FIG. 2. Box 151 requires probing the geometry of the borehole using one of the measuring devices which comprise the invention. At 153 the center depth of investigation (DOI), which is the symmetrical point of the sensitive region of the NMR tool, is determined.

At 155 an estimate of the properties of the mud in the borehole is made. There are a number of alternative methods in which this may be done. In one embodiment of the invention, a depth at which the center DOI is inside borehole for the en tire NMR tool vertical aperture is identified and NMR data are acquired at this depth. The NMR data are analyzed using prior art methods to give an apparent porosity of the mud. If such a depth cannot be identified, an apparent porosity of the mud is determined from the mud composition and the $HI_{mud}$ is estimated by multiplying the fraction of liquid volume in the mud by the HI of the base fluid. The properties of the base fluid may be obtained from the manufacturer of the mud. If such information is not available, $T_{2mud}$ can be estimated from the log data by evaluating a shale interval at which $T_{2mud}$ does not overlap with $T_{2CBW}$. The mud properties estimated from any of these methods is then used as described below to correct the NMR estimated formation porosity of the NMR signals.

At 157 the angle of intercept, $\theta_{intercept}$, of the borehole is obtained. This angle is determined by the two points at which the center DOI of the sensitive region of the NMR tool intercepts the borehole wall. An angle is drawn which is centered at the axis of the NMR tool and which extends from one intercept point to the other along the shorter angular path. The desired angle $\theta_{intercept}$ is half of this angle.

Figure 3:
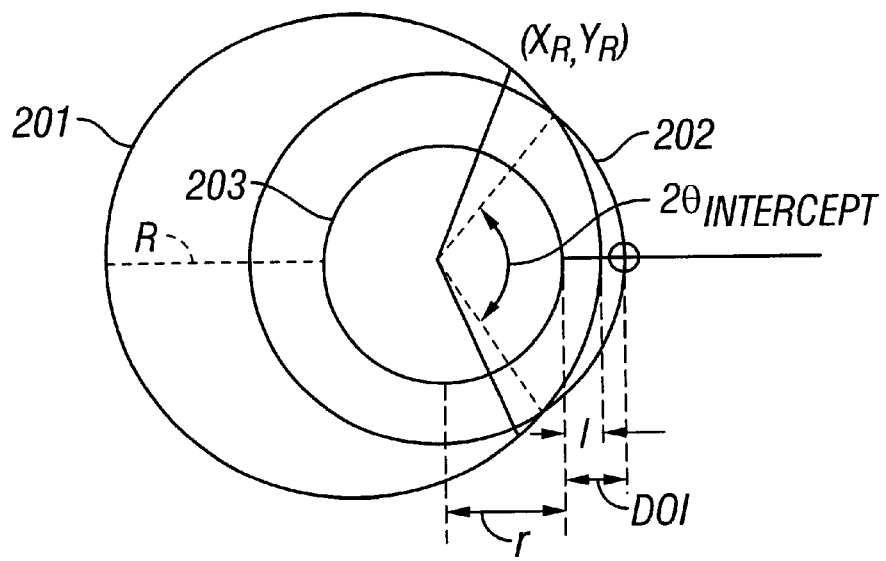
FIG. 3 shows a cross-sectional view of a cylindrical borehole with the logging device non-concentric with the axis of the borehole.

To determine this angle, the practitioner needs to determine the radius of the borehole, R, the amount of the standoff, and the length of the depth of investigation. FIG. 3 illustrates the angle, $2\theta_{intercept}$. Depth of investigation depends on the operation frequency of the NMR tool, and the temperature of the borehole, so these parameters must be recorded.

Next, at 159 the total volume of the sensitive region is determined. This is given by $$V_T = \int_{-\theta_{max}}^{\theta_{max}} 2 \cdot (r + DOI) \cdot \Delta r(\theta) L_T \, d\theta \tag{2}$$

Calculations for total volume can be made using the equation where $\theta_{max}$ is the maximum investigative angle of the NMR tool. For a symmetrical tool, $\theta_{max}$ is $\pi$ radians. $L_T$ is the vertical length of the aperture of the NMR tool and $\Delta r(\theta)$ is an angle-dependent thickness of the sensitive volume. If there is no angle dependency, this last term can be reduced to a constant value, $\Delta r$.

Next, at 161 correction is made for the possibility that at each height along the aperture, some of the sensitive region lies within the formation while some lies outside. As seen in FIG. 3, an estimate for the fractional volume within the formation can be given by can be given by the following equation:

$$\xi_f(z) = \frac{\theta_{intercept}(z)}{\theta_{max}} \tag{3}$$

where $\xi_f(z)$ represents the fraction of the sensitive volume which lies inside the formation at a height z, $\theta_{intercept}$ is the angle subtended by the portion of the sensitive volume within the formation and $\theta_{max}$ is the total angle of sensitivity of the tool.

At 163 the average fraction of the sensitive volume inside arid outside the formation over the full vertical aperture is found. This is given by:

$$\xi_{f,avg}(z) = \frac{1}{\Delta z} \int_{z-\Delta z/2}^{z+\Delta z/2} \frac{\theta_{intercept}(z)}{\theta_{max}} dz \quad (4)$$

where $\xi_{f,avg}(z)$ represents the average of the local volume fractions found at 161, z represents the vertical position at which the measurement is taken, and $\Delta z$ represents the separation distance between measurements.

Often it is necessary to vertically average over many samples to improve SNR. At 165, this is done by obtaining a statistical mean for many values of $\xi$ taken over several separate readings as $$\hat{\xi}_{f,avg}(z_i) = \frac{1}{N} \sum_{k=i-N/2}^{i+N/2-1} \xi_{f,avg}(z_k) \quad (5)$$

At 167, the borehole mud signal contribution to the apparent porosity is determined as:

$$A_{mud} = V_T \cdot HI_{mud} \cdot \hat{\xi}_{b,avg} \text{(in p.u.)}, \quad (6)$$

with $$\hat{\xi}_{b,avg} = 1 - \hat{\xi}_{f,avg} \quad (7)$$

where $V_T \cdot HI_{mud}$ can be obtained from one of the method discussed above at 155. The result of the calculation is herein referred to as the borehole mud signal contribution. This value is subtracted from the apparent porosity, in order to remove the effect of signals of the borehole fluid from the log. The corrected log can be divided by the fraction of rock formation volume to determine the corrected porosity. The following equation shows this result.

$$\phi_{corrected} = \frac{\phi_{apparent}}{\hat{\xi}_{f,avg}}. \quad (8)$$

Where $\phi_{apparent}$ is the apparent porosity and $\phi_{corrected}$ is the corrected porosity.

An alternate and preferred embodiment employs a correction of time domain data 169 in the borehole. Calculations can be carried out similarly to methods in 167, using $$EC_{mud}(j \cdot TE) = A_{mud} \cdot exp(-j \cdot TE/T_{2mud}) \quad (9)$$

Corrections are then made to the original echo train, $ECHO_{orig}$:

$$DECHO = ECHO_{orig} - EC_{mud} \quad (10)$$

And rescaling can be performed on the volumetric factor of DECHO to get $$ECHO_{corrected} = \frac{DECHO}{\hat{\xi}_{f,avg}} \quad (11)$$

In 171, corrected values can now be obtained for petrophysical parameters such as irreducible and movable volumes, porosity, and permeability that are derived from $ECHO_{corrected}$ using prior art methods.

The preferred embodiment can work in many borehole geometries. Simple geometrical borehole shapes can illustrate the method. FIG. 3 shows a circular borehole (201) with an off-center NMR device (203). The center DOI of the NMR device (202) extend into the rock formation over a given angular extent and lies inside the borehole for other angles. The investigative depth extends angularly to a point labeled as ($x_R$, $y_R$) on the surface of the borehole.

For this particular circular cross-section geometry, the angle of intercept where the sensitive volume enters the borehole can be determined by the equation:

$$\theta_{intercept} = \cos^{-1} \frac{(r+DOI)^2 + (l+r)^2 - 2R(l+R)}{2(R-l-r)(r+DOI)}$$

which is derived by matching borehole-centered coordinates with NMR tool-centered coordinates at $\theta_{intercept}$. In the above equation, R is the radius of the borehole, r is the radius of the drill tool, DOI is the distance from the outer surface of the NMR tool to the center depth of investigation, and l is the shortest perpendicular separation distance between the outer surface of the NMR tool and the borehole wall.

Figure 4:
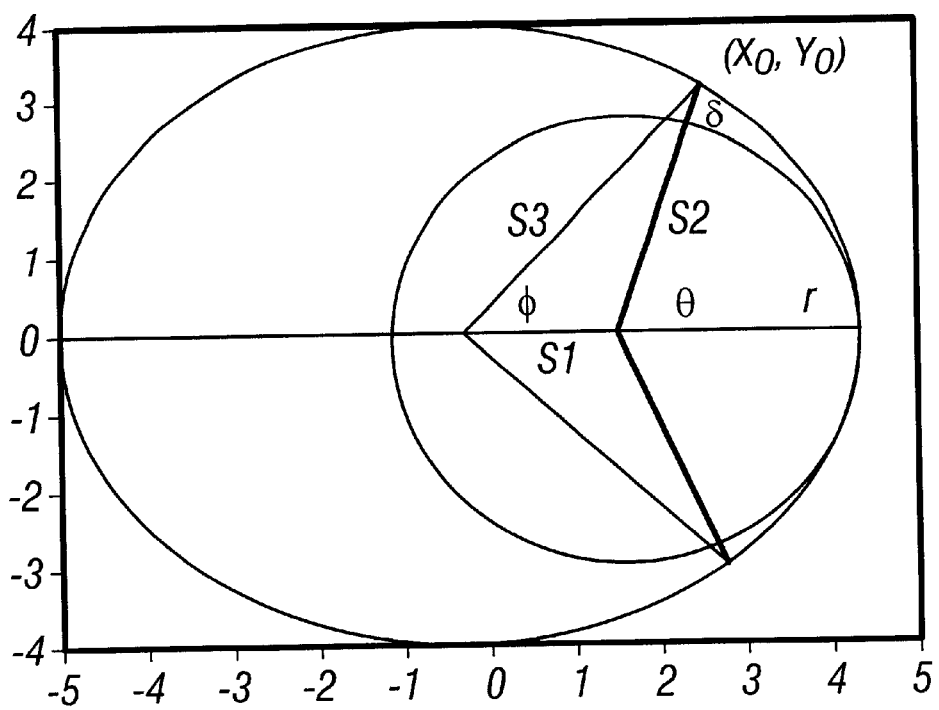
FIG. 4 shows a cross-sectional view of a elliptical borehole with the logging device non-concentric with the axis of the borehole.

Another illustrative example is that of an elliptically shaped borehole. FIG. 4 displays a possible configuration of borehole wall and NMR logging device in a decentralized position in the elliptical borehole. In an elliptical hole, the tool is usually oriented along the long axis. If not in this orientation, it is desirable to first locate the long axis of the borehole, and them to orient the tool along the long axis. A centralized tool may easily move to a decentralized position in a deviated well and in case of small standoffs. In FIG. 4, $\phi$ measures the angle from the center of the borehole to the point ($x_0$,$y_0$) where the DOI intersects the borehole wall, and $\theta$ measures the angle from the center of the logging device to the same points on the borehole wall. The point ($x_0$,$y_0$) can be written in terms of elliptical axes, using $x_0 = a \cos \phi$ and $y_0 = b \sin \phi$ where a and b are the semi-major and semi-minor axes of the ellipse. S1 gives the offset of the center of the logging device from the center of the elliptical borehole. Thus S1=a=r where r is the radius of the logging tool. S2 is the distance from the center of the logging tool to the point ($x_0$,$y_0$) of interception. Thus $$S2 = \sqrt{(a \cos \phi - a + r)^2 + b^2 \sin^2 \phi} = \sqrt{(x_0 - a + r)^2 + y_0^2}$$

S3 represents the distance from the center of the ellipse to the intercept point on the ellipse and is written $$S3 = \sqrt{a^2 \cos^2 \phi + b^2 \sin^2 \phi} = \sqrt{x_0^2 + y_0^2}$$

The distance along the radial line of the logging tool between the outer face of the logging tool and the point ($x_0$,$y_0$), labeled in FIG. 4 as $\delta$, is given by $\delta = S2 - r$. Using the relation $\sin \theta/S3 = \sin \phi/S1$, one can obtain the angle of intercept, given by the equation:

$$\theta = \sin^{-1} \left( \frac{y_0 \sqrt{x_0^2 + y_0^2}}{a \sqrt{(x_0^2 - a - r)^2 + y_0^2}} \right)$$

The method for deriving this equation is the same that is used in the example with the circular borehole. For a sidelooking tool with an arcuate sensitive region of angle $2\Theta$, if $\Theta \leq 0$, then no correction is required.

The embodiment of the invention comprises the use of a measuring device to determine the distances between the NMR tool device and points on the wall of the borehole. One embodiment of the invention comprises one or more mechanical levers acting as calipers to measure standoff distances of the NMR device from the borehole wall. An example of such a device is disclosed in U.S. Pat. No. 4,251,921 to Fink. In this embodiment, the calipers make a standoff measurement of the distances involved simultaneously with the NMR logging. An additional aspect of this invention is an ability to measure borehole rugosity via the standoff measurement devices.

In another embodiment of this invention, standoff measurements are made using an acoustic transducer. A suitable method is disclosed in U.S. Pat. No. 5,737,277 to Priest having the same assignee as the present application and the contents of which are incorporated herein by reference. The acoustic device can be similar to that which is used for acoustic standoff measurement in segmented density tools. In another embodiment, a transducer in the form of an acoustic standoff device measures the standoff and determines the degree of rugosity as well.

In the embodiment utilizing an acoustic standoff device, it is necessary to know the mud velocity, either through knowledge of the controlled process or through measurement. The mud velocity depends on the composition, pressure and temperature of the mud, and these quantities must be monitored if one decides on the former method of determining mud velocity. Such monitoring require a second transducer. It is therefore desired to have direct knowledge of the mud velocity so that it is not necessary to utilize a second transducer for measurement of pressure and temperature. It is proposed in this embodiment to recess the transducer 0.5" to 1" inside the mandrel. In this position, the minimum travel time occurs at the point where the tool is flush against the borehole wall. The mud velocity then is most easily determined by dividing the minimum travel time of the acoustic pulse by the distance by which the acoustic transducer is recessed. Since the minimum time represents the round trip time of the acoustic pulse, this value of mud velocity must be divided by two.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of earth formations using a nuclear magnetic resonance (NMR) logging tool having a volume of investigation conveyed in a borehole in the earth formations, the method comprising:
   (a) obtaining NMR signals indicative of the parameter of interest at at least one depth in the borehole, said obtained NMR signals including effects of a fluid in the borehole;
   (b) processing said obtained NMR signals to obtain an uncorrected value of the parameter of interest;
   (c) determining a fraction of the volume of investigation within the borehole and including said fluid, and determining a correction to the parameter of interest therefrom; and
   (d) determining the parameter of interest by applying said correction to said uncorrected value of the parameter of interest.

2. The method of claim 1 wherein determining said fraction further comprises determining, for a position within a vertical aperture of the logging tool at the at least one depth, an angle subtended by the volume of investigation within the borehole at the logging tool.

3. The method of claim 2 further comprising determining a ratio of said angle to a total angle subtended by the volume of investigation at the logging tool.

4. The method of claim 3 further comprising determining an average of said ratio within the vertical aperture of the logging tool.

5. The method of claim 4 wherein the at least one depth further comprises a plurality of depths, the method further comprising determining an average of said average ratio over the plurality of depths.

6. The method of claim 1 wherein determining said correction further comprises determining an apparent porosity of the fluid in the borehole.

7. The method of claim 6 wherein determining said apparent porosity of fluid in the borehole further comprises making measurements with the logging tool at a depth in the borehole wherein said volume of investigation is substantially within the borehole.

8. The method of claim 1 wherein determining said correction factor further comprises obtaining at least one of (i) a hydrogen index of the fluid in the borehole, (ii) a hydrogen index of a liquid component of the fluid in the borehole, and, (iii) a $T_2$ of the fluid in the borehole.

9. The method of claim 1 further comprising making measurements with the logging tool at a depth wherein a $T_2$ of the fluid in the borehole is substantially non-overlapping with a $T_2$ of clay-bound water in the formation.

10. The method of claim 2 wherein determining said angle further comprises determining a distance between the logging tool and a plurality of positions on a wall of the borehole.

11. The method of claim 10 wherein determining said plurality of distances further comprises using a standoff measuring device.

12. The method of claim 11 wherein the standoff measuring device is selected from the group consisting of (i) a device having a plurality of calipers, and, (ii) an acoustic standoff measuring device.

13. The method of claim 1 wherein the NMR logging tool is conveyed into the borehole on one of (i) a wireline, (ii) a drillstring, and, (iii) coiled tubiing.

14. The method of claim 11 wherein the measuring device is an acoustic standoff measuring device having a recessed transducer for obtaining an acoustic velocity of the borehole fluid.

15. A method of determining a parameter of interest of earth formations using a nuclear magnetic resonance (NMR) logging tool having a volume of investigation conveyed in a borehole in the earth formations, the method comprising:
   (a) obtaining NMR signals indicative of the parameter of interest at at least one depth, said obtained NMR signals including effects of a fluid in the borehole;
   (b) determining a fractional volume of the volume of investigation within the borehole and including said fluid, and determining a correction to the obtained NMR signals therefrom;
   (c) applying said correction to the obtained NMR signals to obtain corrected NMR signals; and
   (d) processing said corrected NMR signals to obtain a corrected value of the parameter of interest.

16. The method of claim 15 wherein determining said fractional volume further comprises determining, for a position within a vertical aperture of the logging tool at the at least one depth, an angle subtended by the volume of investigation within the borehole at the logging tool.

17. The method of claim 16 further comprising determining a ratio of said angle to a total angle subtended by the volume of investigation at the logging tool.

18. The method of claim 17 further comprising determining an average of the ratio within the vertical aperture of the logging tool.

19. The method of claim 18 wherein the at least one depth further comprises a plurality of depths, the method further comprising determining an average of said average ratio over the plurality of depths.

20. The method of claim 15 wherein determining said correction further comprises using an obtained at least one of (i) a $T_2$ of the fluid, (ii) a porosity of the fluid, and, (iii) a hydrogen index of the fluid.

21. The method of claim 20 wherein said relaxation time is obtained by making measurements with the logging tool at a calibration depth wherein said volume of investigation is entirely within the borehole.

22. The method of claim 16 wherein determining said angle further comprises determining a distance between the logging tool and a plurality of positions on a wall of the borehole.

23. The method of claim 22 wherein determining said plurality of distances further comprises using a standoff measuring device.

24. The method of claim 23 wherein the measuring device is selected from the group consisting of (i) a device having a plurality of calipers, and, (ii) an acoustic standoff measuring device.

25. The method of claim 15 wherein the NMR logging tool is conveyed into the borehole on one of (i) a wireline, (ii) a drillstring, and, (iii) coiled tubing.

26. The method of claim 23 wherein the measuring device is an acoustic standoff measuring device having a recessed transducer for obtaining an acoustic velocity of the borehole fluid.

* * * * *